United States Patent [19]
Knapp et al.

[11] 3,772,046
[45] Nov. 13, 1973

[54] TIO₂ SLURRIES HAVING A HIGH SOLIDS CONTENT

[75] Inventors: Donald Edward Knapp, Savannah, Ga.; Lindo Paul Nageroni, Bound Brook, N.J.

[73] Assignee: American Chemical Company, Stamford, Conn.

[22] Filed: Jan. 17, 1972

[21] Appl. No.: 218,453

Related U.S. Application Data

[63] Continuation-in-part of Ser. No. 55,286, July 15, 1970, abandoned.

[52] U.S. Cl. ................................................. 106/300
[51] Int. Cl. ............................................... C09c 1/62
[58] Field of Search ...................................... 106/300

[56] References Cited
UNITED STATES PATENTS

| | | | |
|---|---|---|---|
| 3,649,323 | 3/1972 | Roe et al. | 106/300 |
| 3,674,528 | 7/1972 | Bronson | 106/300 |
| 3,510,334 | 5/1970 | Goodspeed | 106/300 |
| 3,506,466 | 4/1970 | Bramekamp et al. | 106/300 |
| 2,933,408 | 4/1960 | Dempster et al. | 106/300 |
| 3,702,773 | 11/1972 | Hall et al. | 106/300 |

*Primary Examiner*—Delbert E. Gantz
*Assistant Examiner*—James W. Hellwege
*Attorney*—Roland A. Dexter

[57] ABSTRACT

Pigment slurries of 70% by weight solids contents are shown to have long term stability even when exposed to typical paper making chemicals such as calcium carbonate. The aqueous slurries are formulated with pigment containing a small but effective admixed amount of polyhydric alcohol and an alkanolamine, and with water which contains a small but effective amount of a second alkanol-amine which provides a slurry pH of at least 9.

5 Claims, No Drawings

TIO₂ SLURRIES HAVING A HIGH SOLIDS CONTENT

This is a continuation-in-part of our copending U.S. Pat. application Ser. No. 55,286, filed July 15, 1970, now abandoned.

The present invention relates to stable titanium dioxide slurries of high solids content (70% by weight of pigment and higher). It particularly relates to pigment slurries which have stable, low viscosities as the result of the presence of a normal non-volatile polyhydric alcohol in combination with a plurality of alkanolamines.

Titanium dioxide is at present the premier white pigment of commerce. It is generally produced by either hydrolyzing an aqueous solution of a titanium salt such as a sulfate and calcining the hydrolysate at 750°–1000° C. or oxidizing a titanium halide, e.g., titanium tetrachloride, at elevated temperatures of 800° C. and higher, followed by cooling to a temperature below 600° C. The product resulting from the calcination or oxidation contains a substantial amount of oversized, gritty TiO₂ particles which are broken up by either wet or dry grinding. Drying, following wet grinding, frequently causes cementation of agglomerates requiring a further milling treatment before a smooth textured pigment product can be obtained. In the dry milling operation, suspending agents and dispersing aids are often introduced during the milling to facilitate the reduction of the pigment to fine, uniform-sized particles. An optimum means for dry grinding is a fluid energy mill in which the pigment particles are conveyed by a gaseous fluid, such as air or steam, into the outer portion of an inwardly spiralling vortex at high velocity and in a manner which will maintain the vortex at a high rotative speed and a relatively low inward speed whereby the pigment aggregates may be fractured.

Triethanolamine alone and with aerogel has been suggested as a dispersion aid during grinding to enhance the fineness and gloss of titanium dioxide pigments. It has also been suggested that water dispersible titanium dioxide pigments can be produced from calcined pigment material which has been wet milled and preferably hydro-separated by utilizing certain amines as organic dispersants, which amines includes monoethanolamine, morpholine and triethanolamine. Unfortunately, aqueous slurries of high solids content (70% by weight and higher) of such pigments tend to settle and form, upon standing, a hard sediment which is difficult to redisperse.

It is also known that generally water-dispersible TiO₂ pigments form a deflocculated slurry in hard water and consequently settle within 2–3 hours into a very coherent sediment which is extremely difficult to reincorporate to a uniform slurry.

The sedementation characteristics of such aqueous dispersions of titanium dioxide particles have been improved by the presence of normal water soluble polyols, including sorbitol and mannitol. Unfortunately, such polyols frequently degrade when exposed to high temperatures and cause noticeable discoloration.

A copending U.S. Pat. application, Ser. No. 857,583, filed Sept. 12, 1969 now U.S. Pat. No. 3,649,323, teaches that high solids content pigment slurries can be stabilized to useful viscosities by the presence of normal, non-volatile polyhydric alcohol in combination with an alkanolamine. Unfortunately such slurries are unstable in the presence of dry or slurried calcium carbonate which is frequently encountered in the production of paper.

It is an object of the invention to overcome the foregoing and related disadvantages of water dispersed pigment slurries of high solids content.

It is a further object of the invention to obtain a high solids content pigment slurry which is viscosity stabilized, i.e., has resistance to flocculation and settling in water, particularly in the presence of calcium carbonate.

It has been discovered that slurries derived from dry titanium dioxide pigment particles which have been admixed with a small amount of viscosity stabilizer such as sorbitol and triethanolamine are materially improved in their dispersibility and resistance to flocculation in water, particularly aqueous systems having high calcium carbonate content when a second alkanolamine is present.

The amount of the viscosity stabilizing agent carried by pigment of the U.S. Pat. No. 3,649,323 is small. The minimum effective amount has not yet been determined, but the evidence is that this minimum is about 0.2% of the dry weight of the pigment. At the other extreme, pigment carrying more than about 3% by weight of the agent possesses closely similar properties to those possessed by pigment carrying somewhat less agent, so that the value of 3% is taken as the upper practical limit. In practice we find that the optimum amount of agent occurs within the range of about 0.2% to 1%, and this range is accordingly preferred. The scope of the invention is not restricted by the above ingredients. The viscosity stabilizing agent is a normal, nonvolatile polyhydric alcohol, which incluses sorbitol and mannitol, and it is combined with an alkanolamine. Representative of the alkanolamines are: mixed isopropanolamines; diisopropanolamine; diisopropylethanol-amine; 2-amino-2-methyl-1,3-propanediol; 2-amino-2-methyl-1-propanol; 2-amino-2-ethyl-1,3-propanediol; 2-dimethylamino-2-methyl-1-propanol; aminoethanolamine; diethylethanolamine; N-methylethanolamine; methyldiethanolamine; N-aminopropyl-morpholine; digylcolamine; and triethanolamine.

Of these alkanolamines, triethanolamine is preferred because of its unique slurry stabilization property when used in combination with sorbitol and 2-amino-2-methyl-1-propanol. All of these alkanolamines are characterized by the unique property of providing stability to high solids content pigment slurries when admixed with a normal, nonvolatile polydydric alcohol such as sorbitol. They can all be considered water soluble in the contect of this invention.

As noted above in the present invention a second alkanolamine is present in the slurry, however, not all alkanolamines are suitable. The suitable second alkanolamines, characterized by exhibiting a pH at or above 9 in aqueous slurry systems, include: monoethanolamine; aminoethylethanolamine; N-methylethanolamine; diethanolamine; dimethylethanolamine; diisopropylethanolamine; methyldiethanolamine; monoisopropanolamine; diisopropanolamine; morpholine; N-aminopropylmorpholine; 2-amino-2-methyl-1-propanol; 2-amino-1-butanol; 2-amino-2-methyl-1,3-propane diol; and tris-(hydroxymethyl) aminomethane.

The amount of the second alkanolamine present in the slurry may vary within the wide limits but an amount of at least 0.05% to 5.0% (based on the amount of the titanium dioxide present) is preferred. Below 0.5% no useful enhancement of stabilization is discernible. Amounts in excess of 5% do not appear to give sufficiently improved results to warrant the use of the additional alkanolamine is such concentrations.

The titanium dioxide pigment, both anatase and rutile, benefited by the present invention includes those grades which contain small amounts of alkali metal, alkaline earth metal salts and other cations as conditioning agents. In addition the salts of other metals such as antimony and zinc as brighteners and rutile converters may be present. The amount of these salts and agents is usually less than 5% of the weight of the pigment; but, is not restricted to that level.

Dry pigment described in copending application Ser. No. 857,853 can be prepared according to a number of procedures. One convenient method is to meter the input feed of the treating agent and the pigment into a fluid energy mill. With care it is possible to meter the small amount of treating agent uniformly into the stream of pigment prior to entry to the mill, and the mill action may aid in distributing the agent among the particles.

In practice, it is more convenient to supply the reagents by the use of a solvent medium. According to this method the reagents are dissolved in a suitable solvent, e.g., water, and the solution added to dry titanium dioxide pigment prior to milling. Although each of the above reagents improves the compatibility of the pigment with hard water, the combination of sorbitol and triethanol-amine gave pigment the best slurry properties.

The following examples show results of the invention obtained when carrying out the processes therefor.

EXAMPLE 1

1,000 Grams of anatase calciner discharge were blended with sorbitol and triethanolamine. 2.5 Grams of sorbitol as a 70% aqueous solution with 2.5 Grams of triethanolamine were added dropwise onto the calciner discharge. The resultant admixture was vigorously shaken in a container before processing through an 8-inch diameter laboratory micronizer using superheated steam at 460°–470° F. at 120 psig. The resultant coated pigment is then suitable for processing into the high solids content slurries.

EXAMPLE 2

The data set forth in this example show both the utility of the present invention as well as the effect of varying the amount of the second alkanolamine in the water as regards to the pH and stability of the test slurries as shown in Table I. Table II shows the compatibility of the same test slurries with a calcium carbonate slurry. The pigment of EXAMPLE 1 is made into test slurries by first adding the second alkanolamine to water and thereafter adding the pigment with agitation. Sample 1 in both tables is a control slurry with no second amine added to the water.

| Sample | % $TiO_2$* | %AMP** Added | Initial Consistency | $CaCO_3$ Compatibility+ 16 hr. Viscosity*** |
|---|---|---|---|---|
| 1 | 73.0 | 0.0 | Thick | >10⁴ |
| 2 | 74.0 | 0.25 | Fluid | 1790 |
| 3 | 73.5 | 0.50 | Fluid | 1000 |
| 4 | 73.0 | 0.75 | Fluid | 1080 |
| 5 | 74.0 | 1.00 | Fluid | 970 |

References *, , and * are the same as in Table I.
+ This test procedure specifies that equal volumes of slurries of about 70% by weight each of $TiO_2$ and "Snowflake Whiting" $CaCO_3$, are thoroughly hand mixed and the viscosity of the resultant mixture is then measured as a function of time.

EXAMPLE 3

The second alkanolamine as noted is characterized by providing a pH of at least 9 in aqueous high-solids content pigment slurry systems and will retain such a pH over long periods of time, 4 weeks or longer.

Test slurries were prepared according to the procedure of EXAMPLE 2, but other alkanolamines were substituted for the 2-amino-2-methyl-1-propanol at the 0.5% by weight level (based on the $TiO_2$ content). The data of Table III show that the pH of the slurries prepared according to this invention are all ≥ 9.0 after 4 weeks, while the pH of the control slurry, i.e., no second amine, is less than 9.0 initially and is lowered after a 2 week aging period to 7.7.

TABLE III

| Sample No. | Second Alkanolamine | 1 wk. pH | 2 wks. pH | 4 wks. pH |
|---|---|---|---|---|
| 1 | Monoethanolamine | 10.2 | 10.2 | 10.0 |
| 2 | Aminoethylethanolamine | 10.2 | 10.2 | 10.2 |
| 3 | N-methylethanolamine | 10.2 | 10.2 | 10.2 |
| 4 | Diethylethanolamine | 9.9 | 9.9 | 10.0 |
| 5 | Diemethylethanolamine | 9.6 | 9.6 | 9.7 |
| 6 | Diisopropylethanolamine | 9.85 | 9.8 | 9.8 |
| 7 | Diethanolamine | 9.4 | 9.1 | 9.2 |
| 8 | Methyldiethanolamine | 9.0 | 9.1 | 9.2 |
| 9 | Monoisopropanolamine | 10.0 | 10.0 | 10.2 |
| 10 | Diisopropanolamine | 9.2 | 9.2 | 9.2 |
| 11 | Morpholine | 9.2 | 9.2 | 9.3 |
| 12 | N-aminopropyl morpholine | 9.95 | 9.9 | 9.9 |
| 13 | 2,6-Dimethyl morpholine | 9.3 | 8.9 | 9.0 |
| 14 | 2-amino-2-methyl-1-propanol | 10.5 | 10.1 | 10.1 |
| 15 | None (Control) | 8.0 | 7.7 | 7.6 |

(All are characterized by excellent slurry stability and noteworthy stability in the presence of calcium carbonate slurries, except for the control Sample No. 15).

It has been noted in our experimental work that all of the alkanolamines set forth in the above table of this example are equally effective in viscosity and pH stabilization over extended periods of time of slurries containing more than 70% by weight of conventional paper grade pigment (pigment not admixed with sorbitol and triethanolamine).

TABLE I

| Sample | Percent $TiO_2$* | Percent AMP** added | 0 wk. pH | 0 wk. Visc. | 1 wk. pH | 1 wk. Visc. | 2 wk. pH | 2 wk. Visc. | 3 wk. pH | 3 wk. Visc. | 4 wk. pH | 4 wk. Visc.*** |
|---|---|---|---|---|---|---|---|---|---|---|---|---|
| 1 | 73.0 | 0.0 | 8.0 | 440 | 7.7 | 610 | 7.7 | 460 | 7.8 | 510 | 7.6 | 510 |
| 2 | 74.0 | 0.25 | 9.7 | 810 | 9.2 | 1,100 | 9.2 | 1,070 | 9.2 | 1,060 | 9.2 | 1,210 |
| 3 | 73.5 | 0.50 | 10.2 | 860 | 10.0 | 1,120 | 10.0 | 1,150 | 10.0 | 1,260 | 9.8 | 1,220 |
| 4 | 73.0 | 0.75 | 10.4 | 910 | 10.3 | 1,240 | 10.2 | 1,260 | 10.2 | 1,310 | 10.0 | 1,460 |
| 5 | 74.0 | 1.00 | 10.5 | 970 | 10.4 | 1,240 | 10.4 | 1,400 | 10.4 | 1,510 | 10.2 | 1,670 |

*As measured by loss on ignition.
**Percent 2-amino-2-methyl-1-propanol added. Based on weight of $TiO_2$ but added to the water prior to the addition of the pigment.
***Viscosity in all cases is measured in centipoises by Brookfield viscometer Model LVF, No. 4 spindle, at 25° C. and 60 r.p.m.

EXAMPLE 4

Instead of using the admixture of sorbitol and triethanolamine as the additive micronized onto the calciner discharge, a series of alkanolamines were substituted for the triethanolamine in order to access the utility of such varied systems. It was found that these modified high solids content slurries had expected improved stability in the presence of calcium carbonate slurries. The procedure of EXAMPLE I was followed except that the triethanolamine was replaced individually by each of the several alkanolamines as set forth in TABLE IV. The micronized pigment samples were made into test slurries by adding 0.5% 2-amino-2-methyl-1-propanol based upon the weight of the pigment to the water. The pigment containing the referenced alkanolamine was subsequently added in an amount to provide for 72.5% by weight solids slurry.

The viscosity data of column (1) Table IV were obtained from test samples derived by thoroughly hand comixing equal volumes of about 70% by weight slurry of each respective dry sample with a 70% slurry of Snowflake Whiting $CaCO_3$ and measuring the viscosity of each resultant mixture after 16 hours.

The viscosity data of columns (2) and (3) of Table IV are based on the test procedure set forth in said U.S. Pat. No. 3,649,323 in EXAMPLE I, which data hereafter reported were determined initially and after one day; i.e., the viscosity of a 65% solid slurry prepared by diluting a 72% solid slurry of the dry treated pigment with hard water to give a final hardness of about 400 ppm, is measured at the above designated times.

TABLE IV

| Sample | Alkanolamine | Viscosity | | |
|---|---|---|---|---|
| | | After 16 hours (1) | Initial (2) | After one day (3) |
| 1 | Mixed isopropanolamines | 2,500 | 50 | 2,000 |
| 2 | Diisopropanolamine | 3,100 | 50 | 3,200 |
| 3 | Diisopropylethanolamine | 2,700 | 1,300 | 10,000 |
| 4 | 2-amino-2-methyl-1,3-propanediol | 1,700 | 50 | 2,100 |
| 5 | 2-amino-2-methyl-1-propanol | 1,700 | 25 | 5,300 |
| 6 | 2-amino-2-ethyl-1,3-propane diol | 1,650 | 50 | 50 |
| 7 | 2-dimethylamino-2-methyl-1-propanol | 2,000 | 1,100 | 4,150 |
| 8 | Aminoethanolamine | 2,100 | 400 | 4,650 |
| 9 | Diethylethanolamine | 2,100 | 2,150 | 7,350 |
| 10 | N-methylethanolamine | 2,500 | 25 | 4,400 |
| 11 | Methyldiethanolamine | 1,900 | 25 | 1,750 |
| 12 | N-aminopropylmorpholine | 2,300 | 25 | 4,100 |
| 13 | Diglycolamine | 1,950 | 25 | 3,700 |
| 14 | Control | 10,000 | 10,000 | |
| 15 | Triethanolamine | 2,700 | 50 | 50 |

NOTE.—Viscosity in all cases is measured in centipoises by Brookfield viscometer Model LVF, No. 4 spindle, at 25° C. and 60 r.p.m.

The utility of this invention is that it makes bulk handling of slurries possible particularly for the paper industry. The bulk handling advantages would be: elimination of containers for shipping dry pigment; elimination of pallets and warehousing dry $TiO_2$; ease of loading and unloading (by pump and hose) of $TiO_2$ into and from transportation vehicles; ease of storing $TiO_2$ in large quantities in a small space; ease of metering known amounts of pigment to a location within the customer's plant utilizing common pumping and piping facilities; and, lower volume in transit than dry or dry-bulk shipment.

What is claimed is:

1. A high solids content pigment slurry of at least 70% by weight of titanium dioxide pigment dispersed in water, said pigment having admixed therewith from 0.2 to 3.0 weight percent of said pigment of a normal non-volatile polyhydric alcohol of the class consisting of sorbitol, mannitol and mixtures thereof and a first alkanolamine, said slurry containing from 0.50% to 5.0% by weight based on said titanium dioxide content of a second alkanolamine which provides a pH of at least 9 for said slurry, said first alkanolamine being a different compound than said second alkanolamine.

2. Slurry according to claim 1, wherein the polyhydric alcohol is sorbitol and said first alkanolamine is triethanolamine.

3. Slurry according to claim 1, wherein said second alkanolamine is of the class consisting of monoethanolamine; aminoethylthanolamine; N-methylethanolamine; diethanolamine; dimethylethanolamine; diisopropylethanolamine; methyldiethanolamine; monoisopropanolamine; diisopropanolamine; morpholine; N-amino-propylmorpholine; 2-amino-2-methyl-1-propanol; 2-amino-1-butanol; 2-amino-2-methyl-1,3-propanediol; and tris(hydroxymethyl)aminomethane.

4. Slurry according to claim 3, wherein said second alkanolamine is 2-amino-2-methyl-1-propanol and present in an amount of about 0.5% by weight.

5. Slurry according to claim 1, wherein said first alkanolamine is of the class consisting of mixed isopropanolamines; diisopropanolamine; diisopropylethanolamine; 2-amino-2-methyl-1,3-propanediol; 2-amino-2-methyl-1-propanol; 2-amino-2-ethyl-1,3-pro-panediol; 2-dimethylamino-2-methyl-1-propanol; aminoethanolamine; diethylethanolamine; N-methylethanolamine; methyldiethanolamine; diglycolamine; and triethanolamine.

* * * * *

UNITED STATES PATENT OFFICE
CERTIFICATE OF CORRECTION

Patent No. 3,772,046                    Dated November 13, 1973

Inventor(s) DONALD EDWARD KNAPP, ET. AL.

It is certified that error appears in the above-identified patent and that said Letters Patent are hereby corrected as shown below:

On the cover sheet, [73], Assignee change "Chemical" to -- Cyanamid -- . Also on the cover sheet [75], Inventors change "Nageroni" to -- Nangeroni -- . Also on the cover sheet [57] Abstract, line 8, "alkanol-amine" should read -- alkanolamine -- . Column 3, line 16, "No. 857,853" should read -- 857,583 -- . Column 3, line 31, "triethanol-amine" should read -- triethanolamine -- . Column 3, line 39, "with" should read -- and -- . Column 6, line 54, "pro-panediol" should read -- propanediol -- .

Signed and sealed this 6th day of August 1974.

(SEAL)
Attest:

McCOY M. GIBSON, JR.           C. MARSHALL DANN
Attesting Officer              Commissioner of Patents